(12) United States Patent
Namatame

(10) Patent No.: US 11,327,718 B2
(45) Date of Patent: May 10, 2022

(54) ARITHMETIC CIRCUITRY FOR POWER-EFFICIENT MULTIPLY-ADD OPERATIONS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tatsuya Namatame, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/021,315

(22) Filed: Sep. 15, 2020

(65) Prior Publication Data

US 2021/0294572 A1 Sep. 23, 2021

(30) Foreign Application Priority Data

Mar. 19, 2020 (JP) .............................. JP2020-049952
Sep. 14, 2020 (JP) .............................. JP2020-154022

(51) Int. Cl.
*G06F 7/544* (2006.01)
*G06F 7/499* (2006.01)

(52) U.S. Cl.
CPC ........ *G06F 7/5443* (2013.01); *G06F 7/49921* (2013.01)

(58) Field of Classification Search
CPC ........ G06F 7/4991–49921; G06F 7/533–5336; G06F 7/5443
See application file for complete search history.

(56) References Cited

U.S. PATENT DOCUMENTS 5,422,805 A * 6/1995 McIntyre ................ G06F 7/523
708/525
6,571,268 B1 5/2003 Giacalone et al.
(Continued)

FOREIGN PATENT DOCUMENTS

JP 2003241958 A 8/2003
JP 2008242594 A 10/2008
(Continued)

*Primary Examiner* — Matthew D Sandifer
(74) *Attorney, Agent, or Firm* — Holtz, Holtz & Volek PC

(57) ABSTRACT

An arithmetic circuitry includes a first processing circuitry, a second processing circuitry, an adder circuitry, and a saturation logic circuitry. The first processing circuitry divides one input term into blocks each of which being divided for each predetermined digit number, to make a least significant bit of each of the blocks overlap with a most significant bit of the adjacent and low-order block, and calculates a partial product of each of the blocks and the other input term based on Booth recoding in which a sign is controlled when Booth recoding values become ±0. The second processing circuitry simplifies the partial products. The adder circuitry outputs the sum of a result obtained through the simplification and an addition term. The saturation logic circuitry executes saturation processing based on a result outputted by the second processing circuitry and a result outputted by the adder circuitry.

9 Claims, 15 Drawing Sheets

(56) References Cited

U.S. PATENT DOCUMENTS

| | | | |
|---|---|---|---|
| 7,797,366 B2 | 9/2010 | Krithivasan et al. | |
| 2006/0184604 A1* | 8/2006 | Takeuchi | G06F 7/49921 708/620 |
| 2007/0174379 A1* | 7/2007 | Dockser | G06F 7/49921 708/625 |
| 2010/0306301 A1* | 12/2010 | Hurd | G06F 7/5443 708/523 |

FOREIGN PATENT DOCUMENTS

| | | |
|---|---|---|
| JP | 2009527064 A | 7/2009 |
| JP | 2010086547 A | 4/2010 |

* cited by examiner

| BLOCK | | | RECODING | PARTIAL PRODUCT |
|---|---|---|---|---|
| 0 | 0 | 0 | +0 | +0 |
| 0 | 0 | 1 | +1 | +1×X |
| 0 | 1 | 0 | +1 | +1×X |
| 0 | 1 | 1 | +2 | +2×X |
| 1 | 0 | 0 | -2 | -2×X |
| 1 | 0 | 1 | -1 | -1×X |
| 1 | 1 | 0 | -1 | -1×X |
| 1 | 1 | 1 | -0 | -0 |

| p3 \ X | | | POSITIVE | NEGATIVE |
|---|---|---|---|---|
| 0 | 0 | 0 | 0/POSITIVE | 0/NEGATIVE ⇐ |
| 0 | 0 | 1 | 0/POSITIVE | 1/NEGATIVE |
| 0 | 1 | 0 | 0/POSITIVE | 1/NEGATIVE |
| 0 | 1 | 1 | 0/POSITIVE | 1/NEGATIVE |
| 1 | 0 | 0 | 1/NEGATIVE | 0/POSITIVE |
| 1 | 0 | 1 | 1/NEGATIVE | 0/POSITIVE |
| 1 | 1 | 0 | 1/NEGATIVE | 0/POSITIVE |
| 1 | 1 | 1 | 1/NEGATIVE | 1/POSITIVE ⇐ |

FIG. 5

| bit | [15] | [14] | |
|---|---|---|---|
| | !S | S | cin |
| INPUT | 1 | 0 | 0 |
| carry | 0 | - | |
| sum | 1 | 1 | |
| ADDITION | 1 | 1 | |

| bit | [15] | [14] | |
|---|---|---|---|
| | !S | S | cin |
| INPUT | 0 | 1 | 0 |
| carry | 1 | - | |
| sum | 0 | 0 | |
| ADDITION | 1 | 0 | |

| bit | [15] | [14] | |
|---|---|---|---|
| | !S | S | cin |
| INPUT | 1 | 0 | 1 |
| carry | 1 | - | |
| sum | 1 | 0 | |
| ADDITION | 0 | 0 | |

| bit | [15] | [14] | |
|---|---|---|---|
| | !S | S | cin |
| INPUT | 0 | 1 | 1 |
| carry | 1 | - | |
| sum | 0 | 1 | |
| ADDITION | 1 | 1 | |

FIG. 12

| bit | [15] | [14] | |
|---|---|---|---|
| | !S | S | cin |
| INPUT | NOT USED | 0 | 0 |
| carry | 0 | - | |
| sum | 1(FIXED) | 1 | |
| ADDITION | 1 | 1 | |

| bit | [15] | [14] | |
|---|---|---|---|
| | !S | S | cin |
| INPUT | NOT USED | 1 | 0 |
| carry | 0 | - | |
| sum | 1(FIXED) | 0 | |
| ADDITION | 1 | 0 | |

| bit | [15] | [14] | |
|---|---|---|---|
| | !S | S | cin |
| INPUT | NOT USED | 0 | 1 |
| carry | 1 | - | |
| sum | 1(FIXED) | 0 | |
| ADDITION | 0 | 0 | |

| bit | [15] | [14] | |
|---|---|---|---|
| | !S | S | cin |
| INPUT | NOT USED | 1 | 1 |
| carry | 0 | - | |
| sum | 1(FIXED) | 1 | |
| ADDITION | 1 | 1 | |

ARITHMETIC CIRCUITRY FOR POWER-EFFICIENT MULTIPLY-ADD OPERATIONS

CROSS REFERENCE TO RELATED APPLICATIONS

This application is based upon and claims the benefit of priority from the prior Japanese Patent Application No. 2020-049952, filed on Mar. 19, 2020, and the prior Japanese Paten Application No. 2020-154022, filed on Sep. 14, 2020, the entire contents of which are incorporated herein by reference.

FIELD

Embodiments of the present invention relate to an arithmetic circuitry.

BACKGROUND

In accordance with development of computer, an arithmetic circuitry for executing various complicated arithmetic operations is widely used. This arithmetic circuitry is configured by combining a lot of gate circuitries in a complicated manner. The combination of the gate circuitries is optimized for simply executing the arithmetic operation, and not only that, it is optimized based on various viewpoints such as a viewpoint of power consumption and a viewpoint of circuitry formation area. In particular, a multiply-add operation is devised in various ways because of its wide application range. Regarding connection of mutual gates in these arithmetic operations, when the arithmetic operation is not completed within one cycle, there is a case where FFs (Flip Flops) are inserted in the middle of the arithmetic operation, to divide an arithmetic operation stage. Generally, the FFs are sometimes required in terms of a configuration of circuitry, regardless of its high power consumption. It is desired to perform optimization to reduce the number of the FFs, for example.

BRIEF DESCRIPTION OF DRAWINGS

FIG. 4 is a diagram illustrating sign-extended partial products;

FIG. 5 is a diagram illustrating a relation between a sign of the most significant partial product obtained through the division based on the radix-4 Booth recoding and a sign of a product;

FIG. 12 is a diagram illustrating input-output tables of FIG. 10;

FIG. 13 is a diagram illustrating input-output tables of FIG. 11;

FIG. 14 is a diagram illustrating partial product values capable of being obtained by an MSB block of one input term according to one embodiment;

FIG. 15 is a diagram illustrating partial product values capable of being obtained by the MSB block of one input term according to one embodiment;

FIG. 16 is a diagram illustrating partial product values capable of being obtained by the MSB block of one input term according to one embodiment.

DETAILED DESCRIPTION

Figure 1:
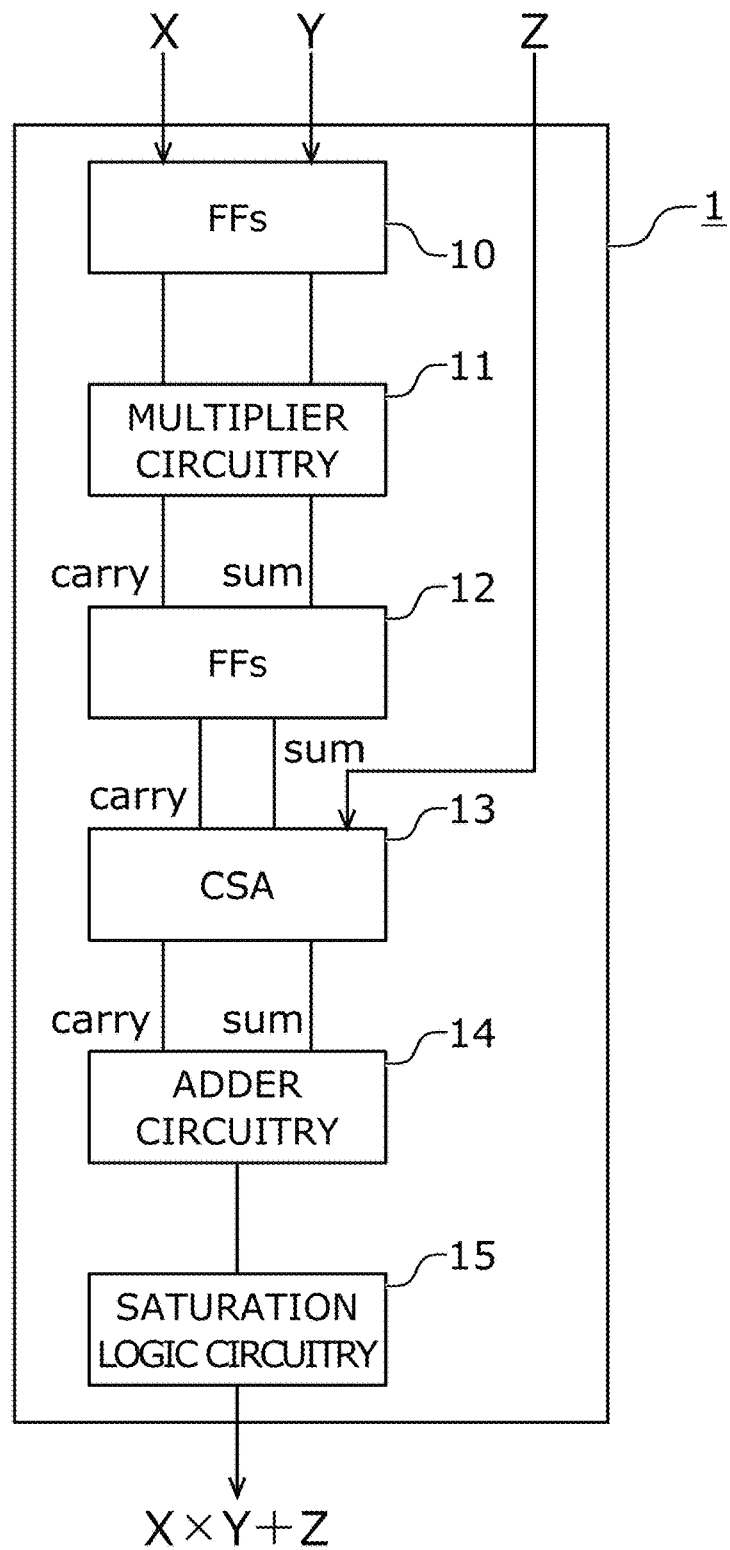
FIG. 1 is a diagram illustrating one example of an arithmetic circuitry according to one embodiment.

According to one embodiment, an arithmetic circuitry includes a first processing circuitry of a multiplier circuitry, a second processing circuitry of the multiplier circuitry, an adder circuitry, and a saturation logic circuitry. The first processing circuitry of the multiplier circuitry divides one input term into blocks each of which being divided for each predetermined digit number, to make LSB of each of the blocks overlap with MSB of the adjacent and low-order block, and calculates a partial product of each of the blocks and the other input term based on Booth recoding in which a sign is controlled when Booth recoding values become ±0. The second processing circuitry of the multiplier circuitry simplifies the partial products. The adder circuitry outputs the sum of a result obtained through the simplification and an addition term. The saturation logic circuitry executes saturation processing based on a result outputted by the second processing circuitry and a result outputted by the adder circuitry.

Hereinafter, embodiments will be described while referring to the drawings. An arithmetic circuitry and an arithmetic method to be described in the present specification can be effectively applied especially when overflow processing is required in signed arithmetic operation. Further, they also contribute to reduction in the number of FFs when a logical operation is configured by a plurality of stages.

FIG. 1 is a block diagram illustrating one example of a configuration of an arithmetic circuitry capable of performing a multiply-add operation according to one embodiment. An arithmetic circuitry 1 is a logic circuitry configured based on a Booth recoding algorithm, and when, for example, three variables of X, Y, and Z each having a certain bit length are input into the arithmetic circuitry 1, the arithmetic circuitry 1 outputs X×Y+Z. The arithmetic circuitry 1 includes FFs 10, a multiplier circuitry 11, FFs 12, a CSA 13, an adder circuitry 14, and a saturation logic circuitry 15. Here, each of X, Y, and Z is set to a number represented by two's complement. Specifically, MSB of each of X, Y, and Z represents a sign, and when it is 0, this indicates a positive integer or zero, and when it is 1, this indicates a negative integer.

X and Y to be input are first stored temporarily in the FFs 10.

The multiplier circuitry 11 calculates a product of X and Y, based on information stored in the FFs 10. This product is expressed in a carry-save form in which it is separated into sum and carry, and temporarily stored in the FFs 12. The multiplier circuitry 11 includes a circuitry which accepts the inputs of X and Y, and calculates partial products by employing Booth Recoding (referred to as a first processing circuitry, hereinafter), and a Wallace Tree circuitry which simplifies an output of the first processing circuitry and outputs it in a carry-save form (referred to as a second processing circuitry, hereinafter).

The first processing circuitry of the multiplier circuitry uses, for example, radix-4 Booth recoding to generate blocks by dividing one of a multiplier input term for each of three digits, and calculates a partial product of each of the blocks and the other term. Further, sign extension or the like is appropriately performed on the partial products, to thereby optimize a bit operation. Details regarding the optimization will be described later. The first processing circuitry is configured to divide one of the multiplier input term for each of predetermined digit number so that LSB of each block and MSB of the next block are shared, and the number of blocks is minimized.

The second processing circuitry of the multiplier circuitry includes, for example, a plurality of CSAs (Carry Save Adders), namely, counters and compressors, and executes simplification of the partial products output by the first processing circuitry.

The CSA 13 adds Z to sum and carry stored in the FFs 12 to create a form of addition of three terms, and outputs these three terms in a carry-save form again configured by sum and carry, with the use of 3-2 counters.

The adder circuitry 14 executes addition of sum and carry output in the carry-save form from the CSA 13. The adder circuitry 14 may be configured by a CLA (Carry Look-ahead Adder). Note that, although the CSA 13 and the adder circuitry 14 are the different elements of the circuitry shown in FIG. 1, the embodiments are not limited in this configuration, such as the adder circuitry 14 may include the CSA 13. In this case, the adder circuitry 14 is, for example, configured to comprise the CSA and the CLA, to add a result outputted by the second processing circuitry and an addition term Z.

When the sum of the result output by the multiplier circuitry 11 and the addition term Z overflows in the adder circuitry 14, the saturation logic circuitry 15 executes saturation processing. For determining the overflow, a sign of the product extracted from the output of the multiplier circuitry 11, a sign of the addition term Z, and a sign of the output result of the adder circuitry 14, are used. When the respective signs are 0, 0, 1 in the aforementioned order, it is determined that the arithmetic result in the adder circuitry 14 overflows in the positive direction and the result is replaced with the positive maximum value, and when the signs are 1, 1, 0, it is determined that the arithmetic result in the adder circuitry 14 overflows in the negative direction and the result is replaced with the negative minimum value. In a manner as above, based on the determination of the overflow, a final value of X×Y+Z is decided and output.

In the arithmetic circuitry 1 according to the present embodiment, there exists no FF that stores a sign bit of X×Y at a timing at which the arithmetic operation of the sum of X×Y and Z is performed. Specifically, the FFs 12 store sum and carry of X×Y, but, they do not have to store the sign information. For this reason, it becomes possible to reduce the FF for storing the sign bit.

In order to reduce the FF as described above, the multiplier circuitry 11 is configured to be able to execute predetermined encoding with respect to the output and extracting the sign information from the information in the carry-save form. Further, the sign information of X×Y is extracted from the information in the carry-save form, and then the sum of X×Y and Z is output.

In the present embodiment, the multiplier circuitry 11 uses radix-4 Booth recoding to divide, with respect to one of input terms, for example, X, the other input term Y for each of three digits and determine partial products, and based on a result of this, a product is calculated.

Hereinafter, in the specification, a numeral within angle bracket in the drawings indicates a bit number based on LSB of a product, a numeral surrounded by circle, for example, 1 surrounded by circle is expressed as a bit "1", and the bit "1" or the like indicates a bit number in the term or in the partial product. Another numeral or character indicates a bit value at a position corresponding to the bit. Note that in the drawings to be described later, a bit "S" indicates a sign bit of each partial product, and a bit "!S" indicates negation of S. Further, a bit "C" indicates a correction bit for two's complement notation of the partial product.

Figures 2, 3:
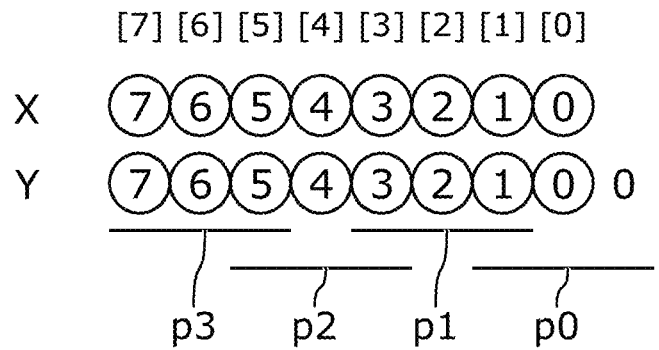
FIG. 2 is a diagram illustrating an example of dividing an input term based on radix-4 Booth recoding according to one embodiment.
FIG. 3 is a diagram illustrating radix-4 Booth recoding values.

FIG. 2 illustrates an example of bit notation of X and Y in the multiplication of eight bits and eight bits, and an example of dividing Y by using radix-4 Booth recoding. For example, X is indicated by a continuous arrangement from a bit "7" being MSB to a bit "0" being LSB. Similarly, Y is indicated by a continuous arrangement from a bit "7" being MSB to a bit "0" being LSB, and since the Booth recoding uses transition of bit value, 0 is virtually added to the right side of LSB of Y, and then Y is divided into blocks. MSB of each block becomes a bit indicating a sign.

Y is divided into blocks p0, p1, p2, and p3 for each of three bits by line segments indicated under Y, and a partial product of each of the divided blocks p0 to p3 and X is calculated.

FIG. 3 is a diagram illustrating a relation between the radix-4 Booth recoding, and the blocks p0 to p3 of Y.

As illustrated in this FIG. 3, when the block of Y is 000, a recoding value becomes +0, and a partial product becomes +0. When the block is 001 or 010, a recoding value becomes +1, and a partial product becomes +1×X. When the block is 011, a recoding value becomes +2, and a partial product becomes +2×X. Further, when the block of Y is 100, a recoding value becomes −2, and a partial product becomes −2×X. When the block is 101 or 110, a recoding value becomes −1, and a partial product becomes −1×X. When the block is 111, a recoding value becomes −0, and a partial product becomes −0. In a manner as above, by referring to the block for each of three bits, the partial product (the sign and the scaling factor of X) is decided.

In this example, Y can be divided for each of three bits, but, when MSB of a block including MSB of Y is not MSB of Y, it is possible to perform processing in a similar manner by performing sign extension on the block including MSB of Y described above, by using a sign of Y.

Figures 4, 5:
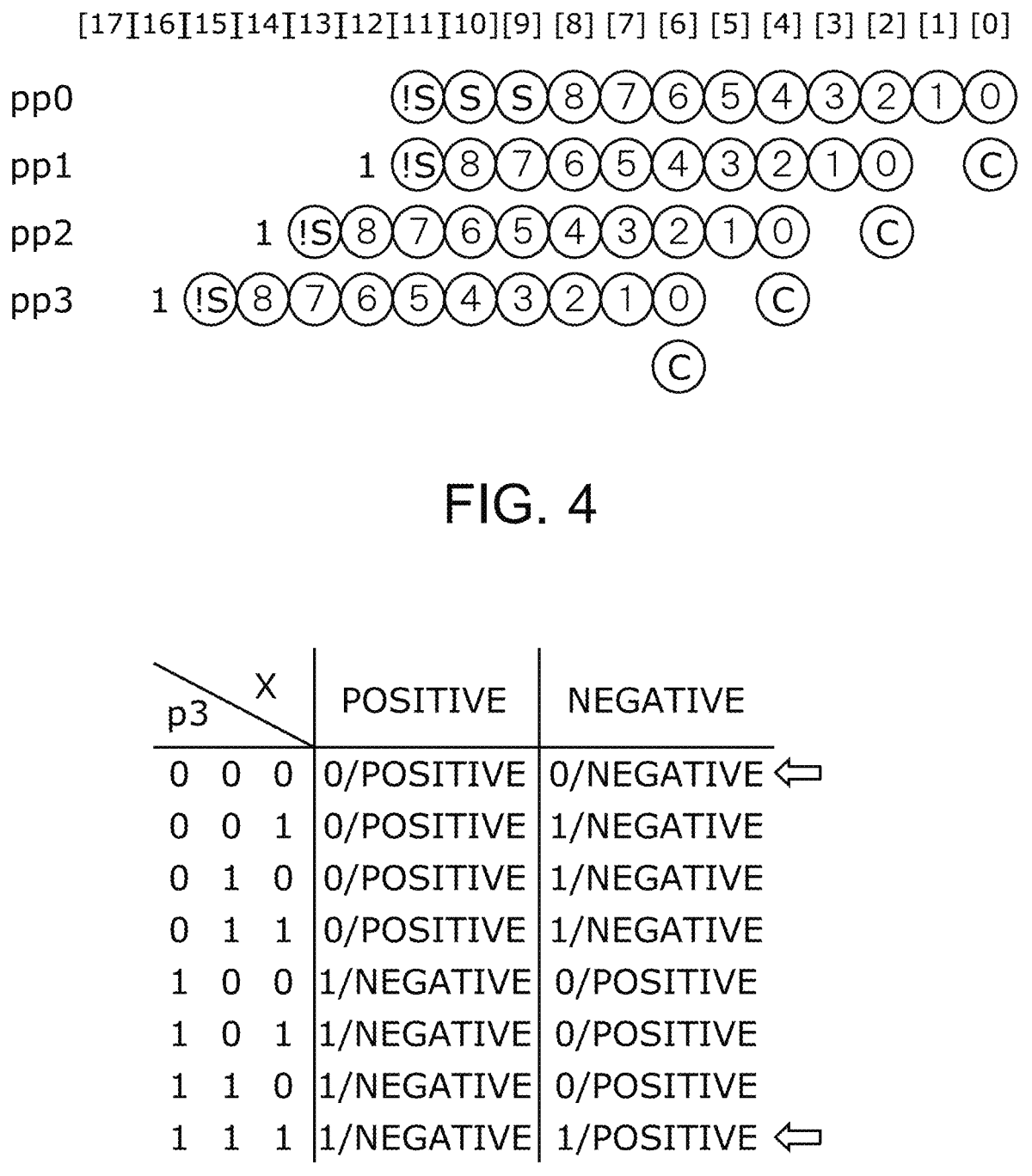

FIG. 4 is a diagram illustrating respective partial products whose digits are aligned through sign extension. Here, a bit "8" is a bit indicating S of each partial product. A partial product pp0 indicates a product of the block p0 of Y and X. Similarly, partial products 'pp1, pp2, and pp3' indicate products of 'the blocks p1, p2, and p3 of Y' and X, respectively. A numeral within angle bracket described at an upper part is a bit number based on LSB of a product.

A product can be obtained by adding all of these partial products. Here, a sign of X×Y is normally calculated from MSB of X and MSB of Y in FIG. 2. If it is possible to extract a sign of the product from an adding path of the partial products, there is no need to provide a dedicated logic and a path for sign calculation. The partial product in which both MSB of X and MSB of Y are related to the arithmetic operation is pp3, and if a bit sequence of pp3 includes a bit indicating a sign of X×Y, and the bit is output as it is as a bit configuring the carry-save form, this can be used for the sign determination of X×Y. For example, it is designed such that the sign of X×Y can be obtained by referring to a bit "!S" of pp3.

FIG. 5 is a diagram illustrating a relation among the sign of X, the block p3, and the negation of !S (namely, S) of the partial product pp3. Since MSB of the block p3 indicates the sign of Y, the sign of X×Y can be obtained by referring to the sign of X and MSB of p3.

Figure 15:
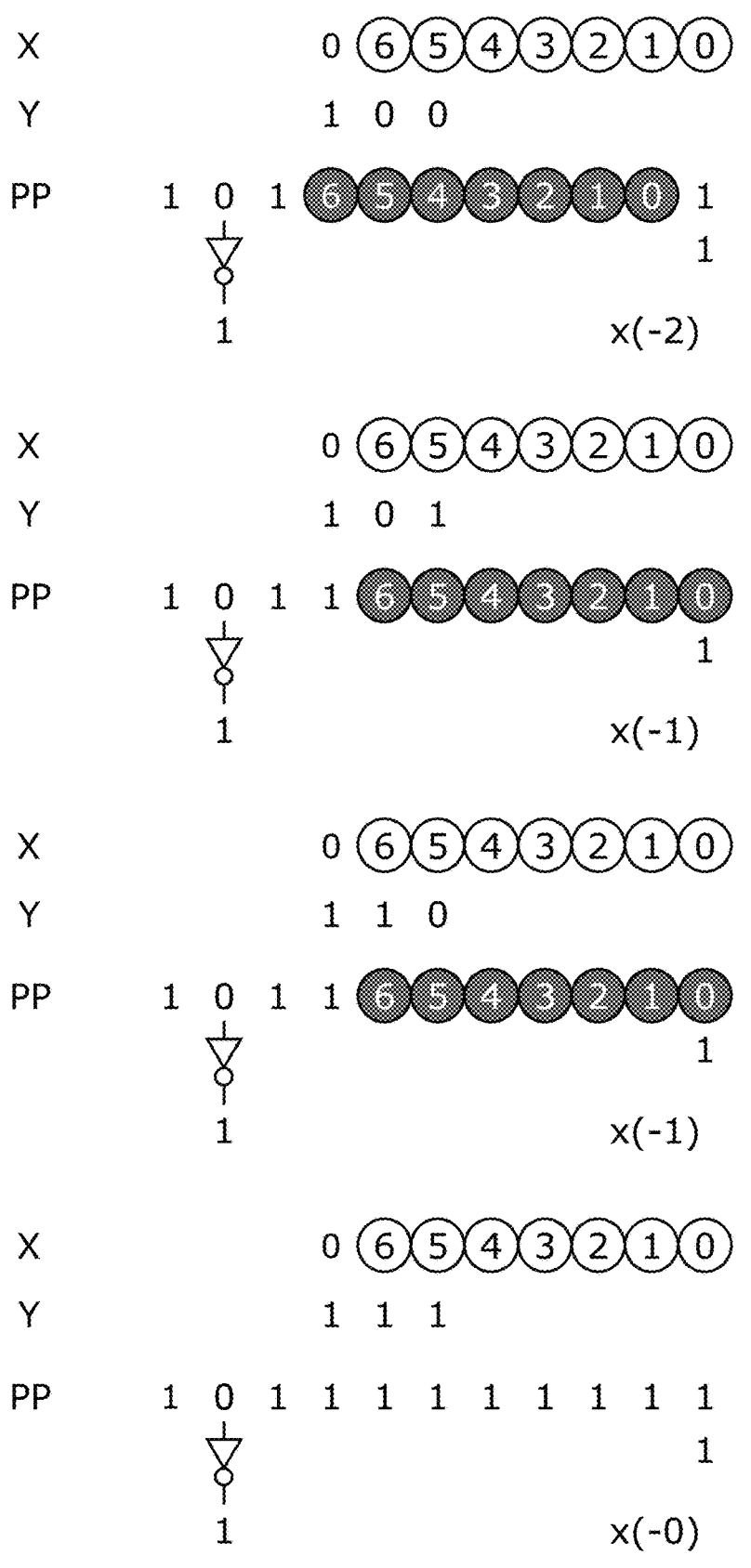
Figure 17:
FIG. 17 is a diagram illustrating partial product values capable of being obtained by the MSB block of one input term according to one embodiment.

Specifically, when X is positive and MSB of p3 is 0, X×Y becomes positive, when X is positive and MSB of p3 is 1, X×Y becomes negative, when X is negative and MSB of p3 is 0, X×Y becomes negative, and when X is negative and MSB of p3 is 1, X×Y becomes positive. Regarding "I" in the table, the left side of "/" indicates a value of S of the partial product pp3, and the right side of "/" indicates a correct sign of X×Y. Note that in the two's complement, MSB when X is zero is 0, so that zero is also treated as a positive number in this case. As a reference, FIG. 14 to FIG. 17 cite patterns capable of being obtained by MSB. FIG. 5 extracts values from FIG. 16 and FIG. 17 among the drawings, and arrow marks in FIG. 5 correspond to arithmetic operations corresponding to FIG. 16 and FIG. 17. In FIG. 15 and FIG. 17, a portion with a white character in a black background indicates a bit as a result of inverting a bit expressed by a black character in a white background.

Here, the partial product pp3 is obtained by scaling X with a recoding value of the block p3 set as a scaling factor, in which when the recoding values are +0 or −0, bit sequences corresponding to the respective recoding values are selected as pp3. For example, when p3 is 000 and X is positive, the recoding value of p3 is +0, so that pp3 becomes "11000000000+0", and since S of a bit "8" becomes 0 and a bit "!S" becomes 1, the determination of sign based on S becomes positive. In this case, an expected sign of X×Y becomes positive since X is positive and Y is positive, and thus the determination of sign based on S and the sign of X×Y coincide with each other. Similarly, when both X and Y are positive and p3 is 001, 010, or 011, the recoding values of p3 become +1 or +2, and pp3 calculated by using the recoding values as scaling factors of X becomes "110xxxxxxxx+0" (x is 0 or 1), so that S becomes 0 and !S becomes 1, resulting in that the determination of sign based on S and the sign of X×Y coincide with each other. Note that the recoding of p3 is performed as illustrated in FIG. 3.

When X is positive and Y is negative, X×Y is negative. When MSB of X is 0 and p3 is 100, 101, 110, or 111, the recoding values become −0, −1, or −2. In this case, pp3 becomes "101xxxxxxxx+1" (x is 0 or 1), so that !S becomes 0 and S becomes 1. As a result of this, the determination of sign based on S becomes negative, which coincides with the sign of X×Y.

When X is negative and Y is positive, X×Y is negative. When MSB of X is 1 and p3 is 001, 010, or 011, the recoding values are +1 or +2, so that !S of pp3 becomes 0 and S becomes 1. As a result of this, the determination of sign based on S becomes negative, which coincides with the sign of X×Y. On the other hand, when p3 is 000, the recoding value is +0, so that pp3 becomes "11000000000+0", and !S becomes 1 and S becomes 0. As a result of this, although the determination of sign based on S is positive, this contradicts with the sign of X×Y.

When X is negative and Y is negative, X×Y is positive. When MSB of X is 1 and p3 is 100, 101, or 110, the recoding values are −1 or −2, so that !S of pp3 becomes 1 and S becomes 0. As a result of this, the determination of sign based on S becomes positive, which coincides with the sign of X×Y. On the other hand, when p3 is 111, the recoding value is −0, so that pp3 becomes "10111111111+1", and !S becomes 0 and S becomes 1. As a result of this, although the determination of sign based on S is negative, this contradicts with the sign of X×Y.

As described above, the results at two places indicated by arrow marks in FIG. 5 become contradicted results. Accordingly, in the present embodiment, when X is negative at a time of dividing Y into blocks and performing Booth recoding, the recoding of 000 and the recoding of 111 are performed in an exchanged manner regarding a block including MSB of Y. The respective recoding values are +0 and −0, and pp3 corresponding to the value +0 and pp3 corresponding to the value −0 are "11000000000+0" and "10111111111+1", respectively, so that this exchange never exerts an influence on the arithmetic results. By this exchange, in the aforementioned example, it becomes possible to appropriately determine the sign of X×Y by referring to S of pp3. Note that when X is positive, correct results are obtained in a case where the recoding value of p3 is either +0 or −0, so that it becomes possible to appropriately determine all signs.

Further, when a combination of input terms is zero and negative, the sign is determined as negative. However, this does not become a factor by which the overflow is judged to occur in the saturation logic circuitry 15, and thus can be ignored.

Hereinafter, explanation will be made on implementation in which the recoding results indicated above are exchanged and a sign can be correctly extracted from a carry-save form.

Figure 6:
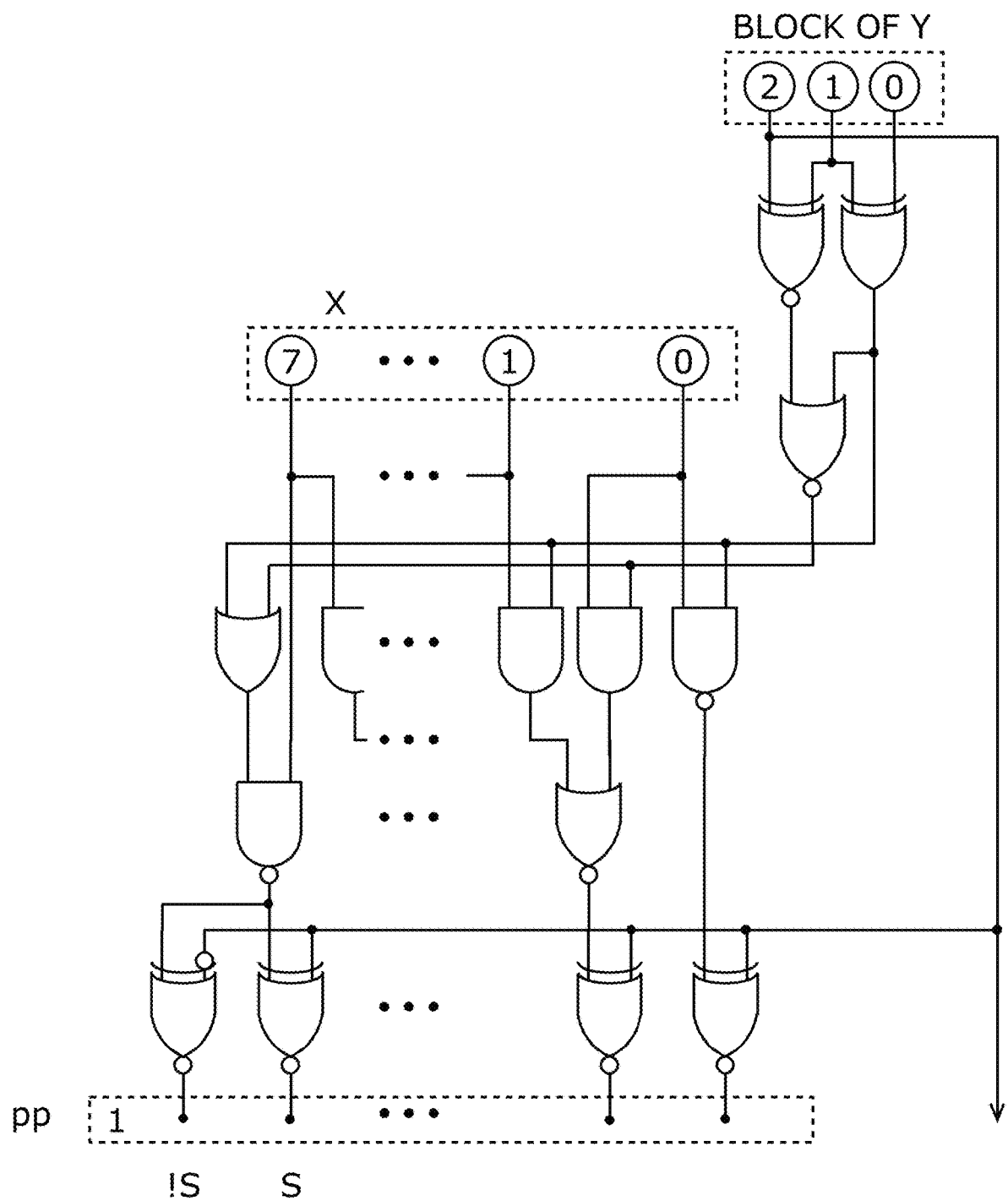
FIG. 6 is a diagram illustrating a circuitry that calculates a partial product with respect to a block including no most significant bit (MSB) and least significant bit (LSB), of a multiplier according to one embodiment.

FIG. 6 is a circuitry that calculates a partial product with respect to a block other than a block including MSB of Y in the multiplier circuitry 11. In the following description, X is set to have eight bits, but, the configuration is not limited to this, and it is possible to increase or decrease a bit appropriately. When X has eight bits, a bit corresponding to a bit "7" is a bit corresponding to MSB.

The circuitry diagram illustrated in FIG. 6 is generally used, so that detailed explanation thereof will be omitted. At a place indicated as pp (partial product) at a lower part of this FIG. 6, a partial product with respect to the input block of Y is output. This circuitry is illustrated as one example, and it may partially employ an equivalent circuitry.

For example, a value corresponding to a !S bit in FIG. 6 of pp of the partial product may be obtained by simply negating an output S being a bit whose order is lower by one than the !S bit. The same applies to FIG. 7 to be described next.

Figure 7:
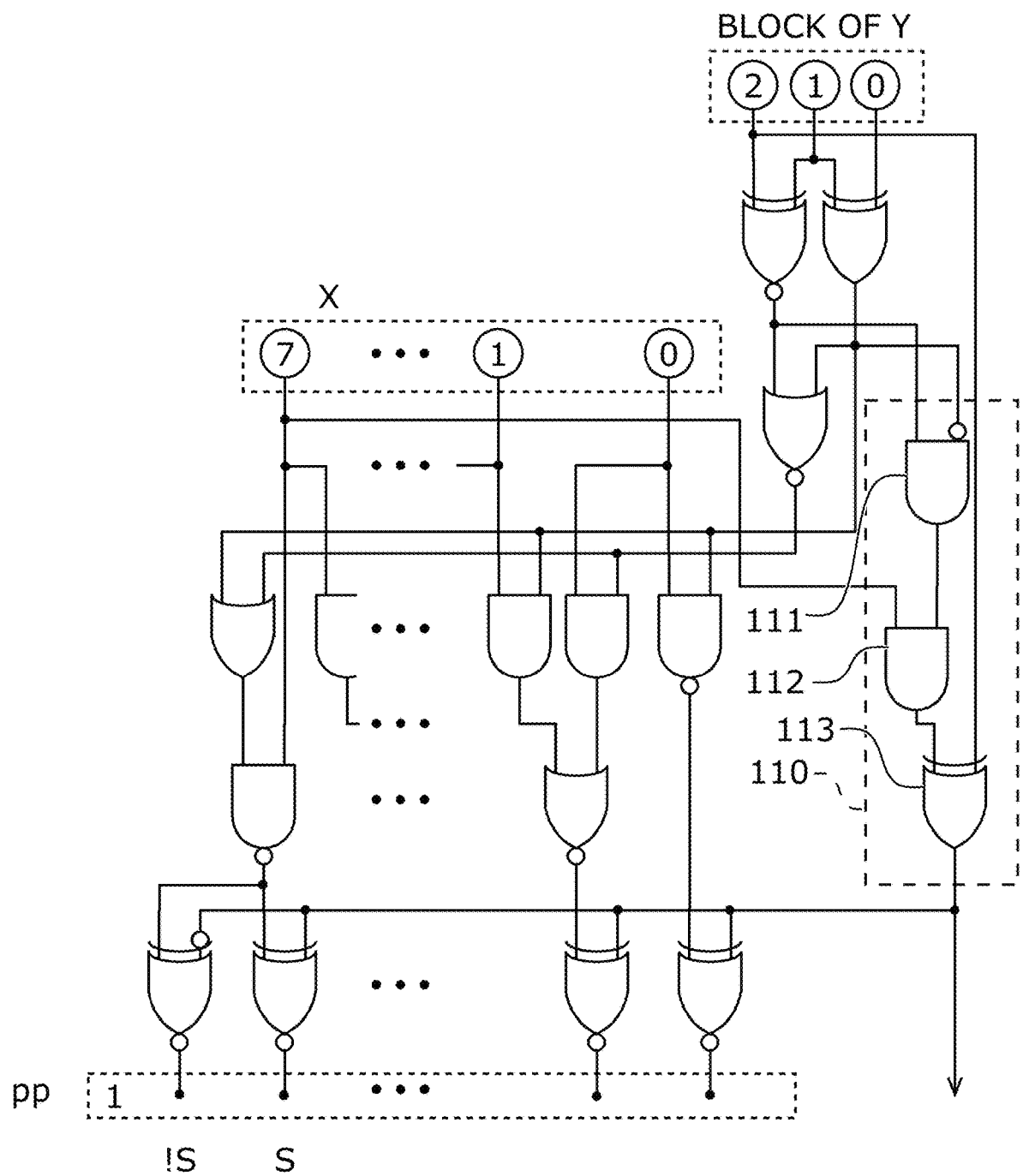
FIG. 7 is a diagram illustrating a circuitry that calculates a partial product with respect to a block including MSB, of a multiplier according to one embodiment.

FIG. 7 is a circuitry that calculates a partial product with respect to the block including MSB of Y in the multiplier circuitry 11. A sign control circuitry 110 surrounded by a dotted line is a part different from the circuitry illustrated in FIG. 6. When the block of Y is 000 or 111, processing of conversely converting a sign of the block using MSB of X is executed. An output of this additional circuitry is a bit indicating a sign of the block of Y.

First, when all bits of the block of Y are the same value, the sign control circuitry 110 outputs 1 in an AND circuitry 111 arranged at the top within the dotted line, and outputs 0 when even one of the values is different. Next, there is provided an AND circuitry 112 that determines a logical product of the output of the AND circuitry 111 and MSB of X. Since this second AND circuitry 112 is added, there is formed a circuitry that returns 1 when X is negative and the block of Y has the bits of the same value, and returns 0 in the other cases. Further, by an EXOR circuitry 113 provided at an output stage, the exclusive logical sum of the output of the second AND circuitry 112 and MSB of Y is output. Specifically, there is formed a circuitry by which, when X is negative and the block of Y has the bits of the same value, MSB of Y is inverted to be output, and in the other cases, MSB of Y is output.

By making such a sign control circuitry 110 to be included in the recoding circuitry with respect to the block including MSB of Y, it is possible to perform control so that an appropriate sign bit is output from the multiplier circuitry 11.

As described above, according to the present embodiment, in the case of determining the partial product regarding the block including MSB of Y, the sign control circuitry 110 that outputs the sign bit different from the other blocks is provided, so that it is possible to realize a configuration including no FF that stores the sign in the multiplication of X×Y, as illustrated in FIG. 1. This sign control circuitry 110 can be formed by a simple configuration by using only several logic gates, so that power consumption smaller than that of FF that stores one bit is realized. As a result of this, it becomes possible to reduce power consumption as the arithmetic circuitry 1. For example, in a case of a circuitry that executes a large amount of multiply-add operations such as an FIR filter, by using this arithmetic circuitry 1, it becomes possible to reduce power consumption by (difference power between an FF for one bit and several logic gates)×(number of implemented multiply-add operation circuitries).

Next, explanation will be made on the second processing circuitry simplifying the output from the circuitry, that operates the partial products, of the multiplier circuitry 11 described above. By the above-described sign control circuitry 110, the partial products are output as illustrated in FIG. 4. In the second processing circuitry, the partial products illustrated in FIG. 4 are input into a plurality of CSAs in a form in which, in particular, 1 of pp3 arranged at a bit [16] and a bit "!S" of pp3 arranged at a bit [15] are not input, and output in a carry-save form divided into sum and carry.

Figure 8:
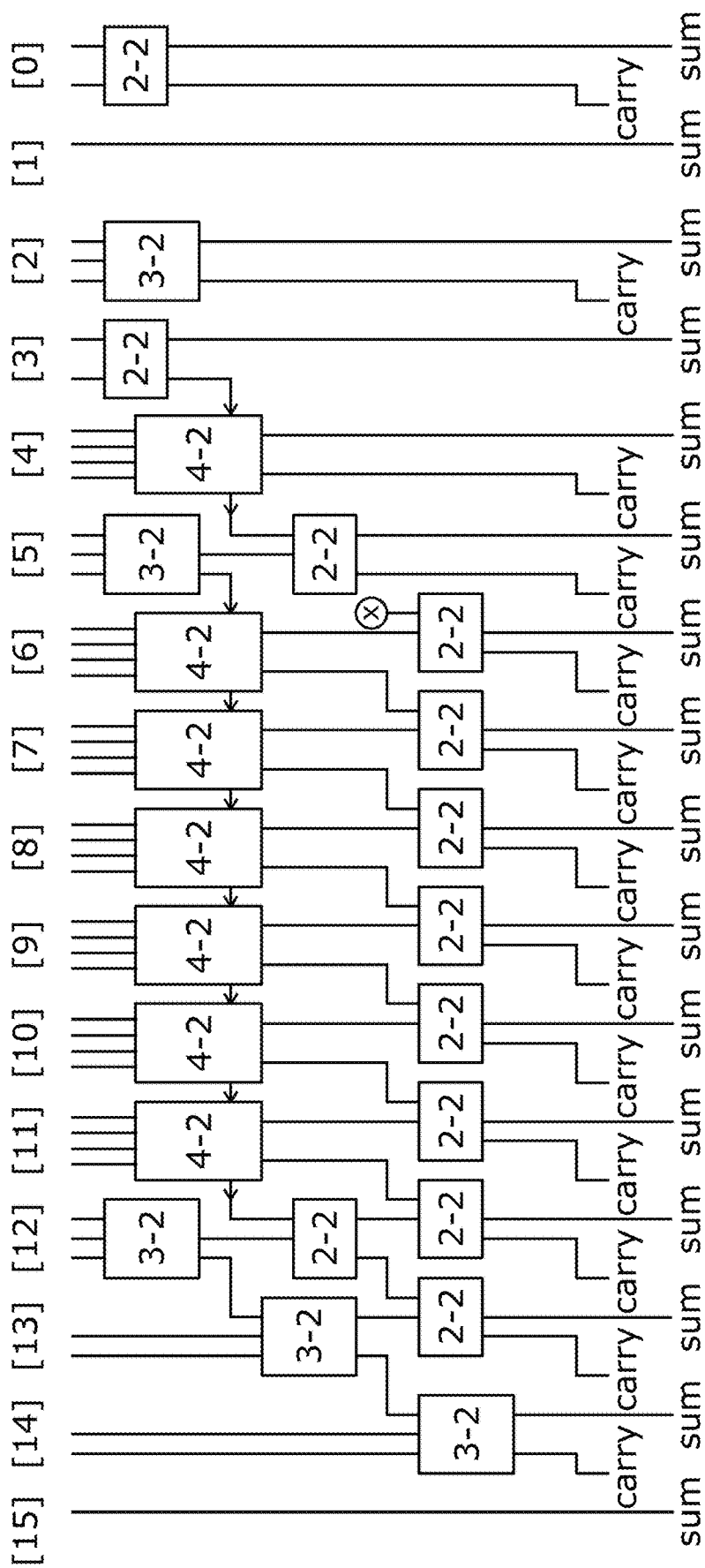
FIG. 8 is a diagram illustrating a second processing circuitry of a multiplier circuitry according to one embodiment.

FIG. 8 is a diagram illustrating one example of the second processing block that simplifies the partial products and is provided to the multiplier circuitry 11. The second processing circuitry includes a plurality of 4-2 compressors, a plurality of 3-2 counters, and a plurality of 2-2 counters being variations of CSA, for example.

In FIG. 8, "4-2" indicates the 4-2 compressor, "3-2" indicates the 3-2 counter, and "2-2" indicates the 2-2 counter. A numeral within angle bracket shown at an upper part indicates a number of bit based on LSB of a product.

This FIG. 8 illustrates an example of connection among the 4-2 compressor, the 3-2 counter, and the 2-2 counter, and sum and carry being outputs, for each bit, regarding the partial products illustrated in FIG. 4. For this reason, when the bit numbers of X and Y are different, a different configuration is made, but this can also be implemented by extending the configuration based on the disclosure described in the present embodiment.

At a bit [0], a bit "0" of the partial product pp0, and a bit "C" are input into the 2-2 counter, and sum and carry are output.

At a bit [1], a bit "1" of the partial product pp0 is output as sum.

At a bit [2], a bit "2" of the partial product pp0, a bit "0" and a bit "C" of the partial product pp1 are input into the 3-2 counter, and sum and carry are output.

At a bit [3], a bit "3" of the partial product pp0, and a bit "1" of the partial product pp1 are input into the 2-2 counter, sum is output, and a carry-out output from the 2-2 counter is input, as a carry-in, into the 4-2 compressor at a bit [4].

At the bit [4], the carry-out from the bit [3] is input as the carry-in, a bit "4" of the partial product pp0, a bit "2" of the partial product pp1, a bit "0" and a bit "C" of the partial product pp2 are input into the 4-2 compressor, and sum and carry are output. Further, another carry-out generated in the 4-2 compressor is input into the 2-2 counter at a bit [5].

At the bit [5] and thereafter, respective bits in the partial products in FIG. 4 are input into the 2-2 counters, the 3-2 counters, and the 4-2 compressors, and sum and carry corresponding to the respective bits are output, in a similar manner. Note that a bit "C" of the partial product pp3, for example, is input into x at a bit [6].

As described above, the second processing circuitry uses the CSAs to simplify the partial products, and outputs the result in the carry-save form.

As described above, such a second processing circuitry is provided to the multiplier circuitry 11, and on the other hand, by making S of pp3 being a bit for sign determination to be disposed as it is in the carry-save form to be output, without being input into the CSA of the second processing circuitry, and by referring to this bit, it becomes possible to extract the sign of X×Y without a dedicated product sign generation logic and path.

Hereinafter, another example of the second processing circuitry will be described.

Figure 9:
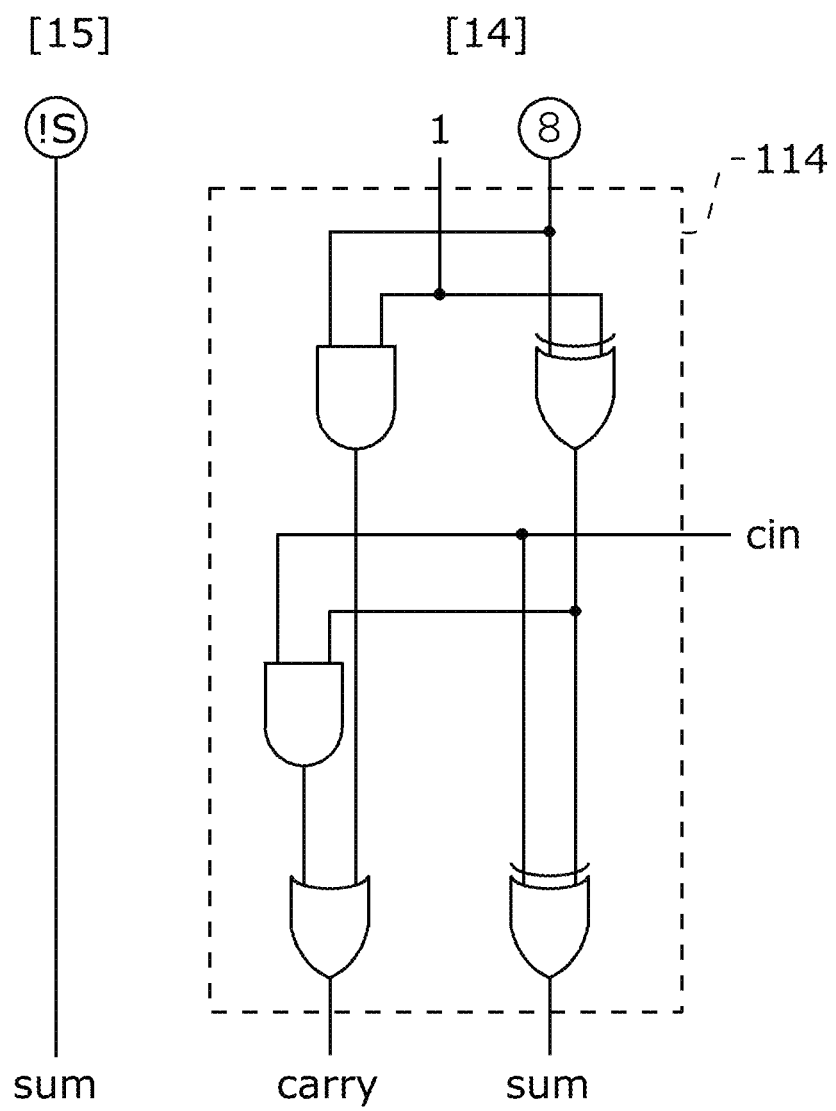
FIG. 9 is a diagram illustrating a second processing circuitry of a multiplier circuitry according to one embodiment.

FIG. 9 illustrates a circuitry diagram related to a bit [14] and a bit [15] in FIG. 8 of the second processing circuitry according to one embodiment. At an output of the bit [14], there is provided a 3-2 counter 114 into which a carry-in cin from the 3-2 counter at a bit [13], a constant 1 of the partial product pp2 illustrated in FIG. 4, and a bit "8" (=S) of the partial product pp3 are input, as illustrated in FIG. 8. A bit "!S" at the bit [15] used for sign determination of X×Y is not input into the CSA but is set as it is as sum at the bit [15]. The contents of the 3-2 counter 114 are described as one example, and are not limited to this implementation.

Figure 10:
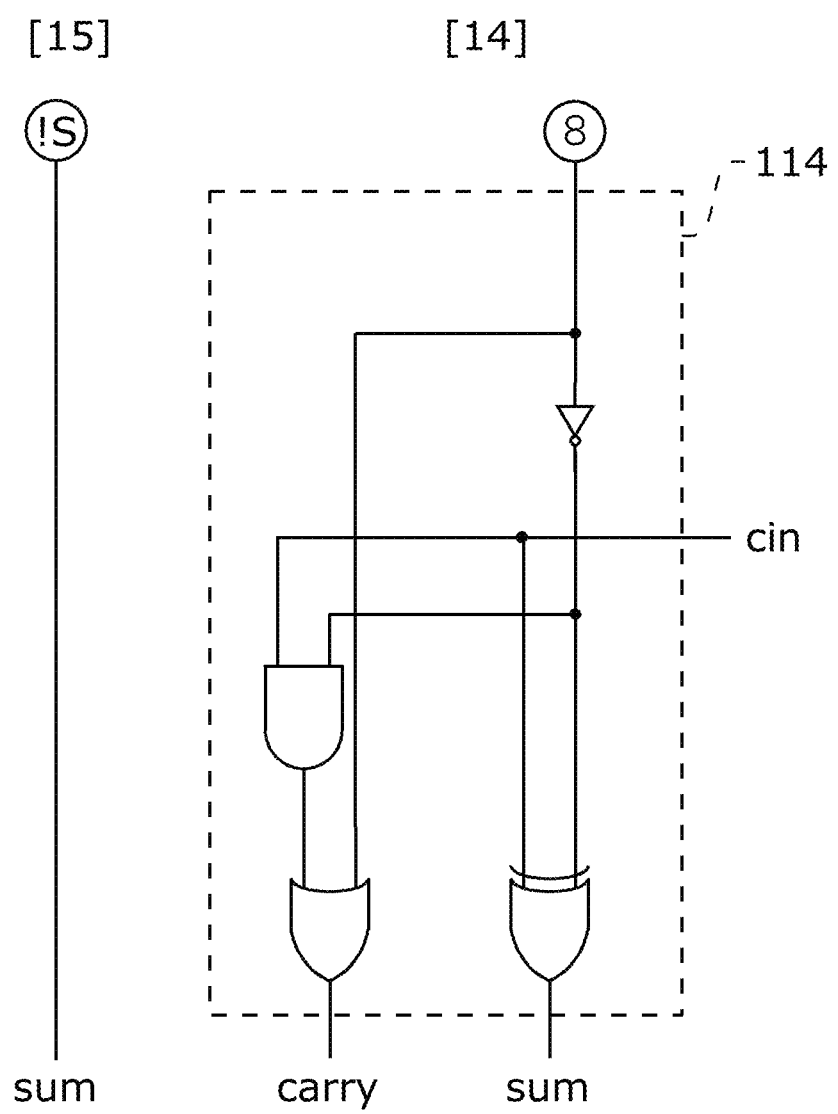
FIG. 10 is a diagram illustrating a second processing circuitry of a multiplier circuitry according to one embodiment.

FIG. 10 illustrates a circuitry as a result of simplifying the circuitry illustrated in FIG. 9. In FIG. 9, one of the values input at the bit [14] is 1, so that the output of the AND circuitry arranged at an upper stage of the 3-2 counter 114 becomes the bit "8" of the partial product pp3, and the output of the EXOR circuitry becomes negation of the bit "8" of the partial product pp3. For this reason, when calculating the partial product as in the present embodiment, the 3-2 counter 114 can employ a simplified circuitry as in FIG. 10.

As described above, according to the present embodiment, it is possible to extract the sign from the bit in the carry-save form output by the second processing circuitry. This second processing circuitry can also be configured by using a simple circuitry, as illustrated in FIG. 10. This can be realized by, when the Booth recoding values become ±0, exchanging these values to appropriately generate the bit capable of being used for the sign determination, and outputting the bit for sign determination as it is as the bit in the carry-save form, as described above.

Figure 11:
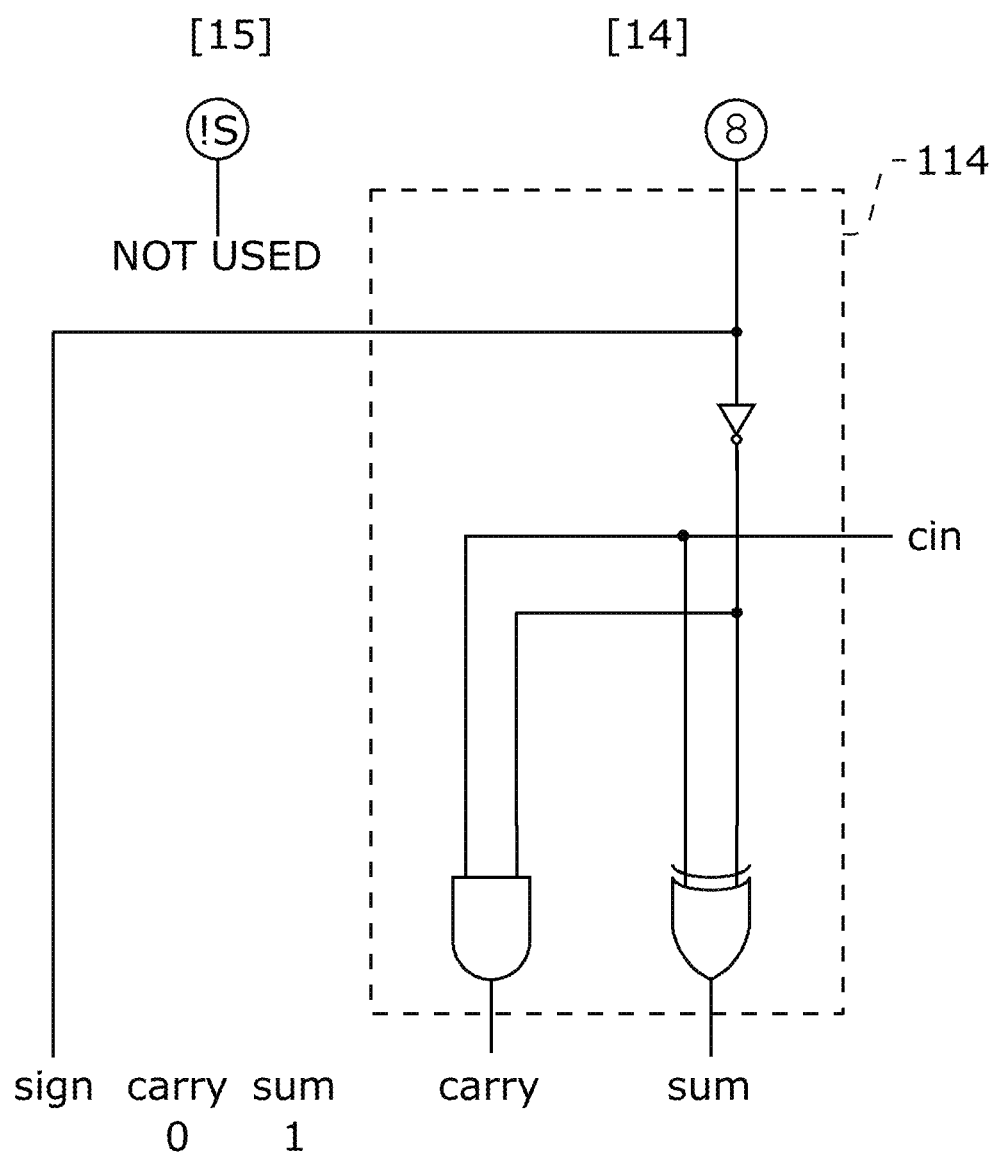
FIG. 11 is a diagram illustrating a second processing circuitry of a multiplier circuitry according to one embodiment.

FIG. 11 is a circuitry as a result of further improving the circuitry in FIG. 10. A bit "8" in FIG. 10 indicates a carry-out after a fixed value 1 is added, at a previous stage of inputting cin, and when this is set to a carry-in at a bit [15] and further, when a fact that an input bit "!S" at the bit [15] and the input bit "8" (=S) at the bit [14] are in an inverted relation is utilized, sum and carry at the bit [15] are fixed to 1 and 0, respectively. As a result of this, as illustrated in FIG. 11, the bit "!S" at the bit [15] becomes unnecessary. Conclusively, the sum output at the bit [14] becomes the exclusive logical sum of the negation of the bit "8" of the partial product pp3 and the carry-in cin from the 3-2 counter at the bit [13], and further, the carry output at the bit [14] is simplified as a logical product of the negation of the bit "8" of the partial product pp3 and the carry-in cin from the 3-2 counter at the bit [13].

When S=0, in the example of FIG. 10, carry at the bit [14] becomes 0 if cin is 0, and it becomes 1 if cin is 1, so that the final result of the bit [15] becomes 1 if cin is 0, and it becomes 0 if cin is 1. In the example of FIG. 11, carry at the bit [14] becomes 0 if cin is 0, and it becomes 1 if cin is 1, so that the final result of the bit [15] becomes 1 if cin is 0, and it becomes 0 if cin is 1.

Similarly, when S=1, in the example of FIG. 10, carry output from the bit [14] becomes 1 if cin is 0, and it becomes 1 if cin is 1, so that the final result of the bit [15] becomes 1 if cin is 0, and it becomes 1 if cin is 1. In the example of FIG. 11, carry at the bit [14] becomes 0 if cin is 0, and it becomes 0 if cin is 1, so that the final result of the bit [15] becomes 1 if cin is 0, and it becomes 1 if cin is 1.

FIG. 12 and FIG. 13 are diagrams that summarize sum, carry, and results of addition of sum and carry regarding combinations of inputs in FIG. 10 and FIG. 11, respectively. Since carry output from the bit [14] is added to sum at the bit [15], it is described in a column of the bit [15]. In a manner as above, FIG. 10 and FIG. 11 become equivalent.

Further, since the bit "8" of pp3 at the bit [14] is S, by extracting this, this can be used for the sign determination of X×Y. In this case, an FF for storing the extracted value of the bit "8" of pp3 is newly required, but, since sum at the bit [15] becomes a fixed value 1, an FF for storing this bit becomes unnecessary. Similarly, also in FIG. 9 and FIG. 10, although it is possible to use the bit "8" for the sign determination, this method is not employed for suppressing a load. These respective circuitries can be appropriately selected according to conditions, environments, and so on under which the arithmetic circuitry 1 is used.

By using the circuitry illustrated in FIG. 10, although it is possible to delete an exclusive logical sum circuitry for sign bit and an FF for sign bit, it is required to provide an exchange circuitry when performing the Booth recoding with respect to 000 and 111, but, it is possible to reduce the power consumption.

By using the circuitry illustrated in FIG. 11, although it is possible to delete an exclusive logical sum circuitry for sign bit and an FF for sum at the bit [15], it is required to provide an exchange circuitry when performing the Booth recoding with respect to 000 and 111, but, it is possible to reduce the power consumption also in this case.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An arithmetic circuitry, comprising:
   a first processing circuitry which calculates partial products of a first input term and a second input term based on Booth recoding in which a sign of a product of the first input term and the second input term is controlled when Booth recoding values become ±0, by dividing the second input term into blocks of a predetermined number of digits, the predetermined number being a radix for Booth recoding, to make a least significant bit of each of the blocks overlap with a most significant bit of an adjacent and lower-order block;
   a second processing circuitry which simplifies the partial products;
   an adder circuitry which outputs a sum of an output of the second processing circuitry and a third term which is an addition term; and
   a saturation logic circuitry which performs saturation processing based on the output of the second processing circuitry and an output of the adder circuitry,
   wherein the first processing circuitry comprises:
      a first recoding circuitry corresponding to a block including the most significant bit of the second input term; and
      a second recoding circuitry corresponding to another block which does not include the most significant bit of the second input term,
      wherein the first and the second recoding circuitry have different configurations.

2. The arithmetic circuitry according to claim 1, wherein the saturation logic circuitry extracts the sign of the product from a bit set of a sum output from the second processing circuitry, the output from the second processing circuitry including sum bits and carry bits and not including a sign bit.

3. The arithmetic circuitry according to claim 2, wherein the first recoding circuitry includes a circuitry that inverts the sign of the product when the Booth recoding values become +0.

4. The arithmetic circuitry according to claim 3,
   wherein the first recoding circuitry controls a result of the Booth recoding by using a most significant bit of the first input term and a bit included in the block having the most significant bit of the second input term.

5. The arithmetic circuitry according to claim 1, wherein the first recoding circuitry includes a circuitry that inverts the sign of the product when the Booth recoding values become +0.

6. The arithmetic circuitry according to claim 5,
   wherein the first recoding circuitry controls a result of the Booth recoding by using a most significant bit of the first input term and a bit included in the block having the most significant bit of the second input term.

7. An arithmetic circuitry, comprising:
   a first processing circuitry which calculates partial products of a first input term and a second input term based on Booth recoding in which a sign of a product of the first input term and the second input term is controlled when Booth recoding values become ±0, by dividing the second input term into blocks of a predetermined number of digits, the predetermined number being a radix for Booth recoding, to make a least significant bit of each of the blocks overlap with a most significant bit of an adjacent and lower-order block;

a second processing circuitry which is connected to the first processing circuitry, and which simplifies the partial products and outputs a simplified result;

a plurality of flip flops connected to the second processing circuitry, and which store the simplified result;

an adder circuitry which is connected to each of the flip flops, and which outputs a sum of an output of the second processing circuitry and a third term which is an addition number; and a saturation logic circuitry which is connected to the adder circuitry, and which executes saturation operation based on the output of the second processing circuitry and an output of the adder circuitry.

8. The arithmetic circuitry according to claim 7, wherein the saturation logic circuitry extracts the sign of the product from a bit set of a sum output by the second processing circuitry.

9. An arithmetic circuitry, comprising:

a first processing circuitry which calculates partial products of a first input term and a second input term based on Booth recoding in which a sign bit of a product of the first input term and the second input term is controlled when Booth recoding values become ±0, by dividing the second input term into blocks of a predetermined number of digits, the predetermined number being a radix for Booth recoding, to make a least significant bit of each of the blocks overlap with a most significant bit of an adjacent and lower-order block;

a second processing circuitry which is connected to the first processing circuitry, and which simplifies the partial products and outputs a simplified result;

a plurality of flip flops comprising bits corresponding to sum bits without a most significant bit thereof, carry bits, and the sign bit, the plurality of flip flops being connected to the second processing circuitry, and storing the simplified result without the most significant bit of the sum bits and with the sign bit;

an adder circuitry which is connected to each of the flip flops, and which outputs the sum of the simplified result and an addition number; and a saturation logic circuitry which is connected to one of the flip flops storing the sign bit and the adder circuitry, and which executes saturation operation based on the output from the second processing circuitry and an output from the adder circuitry.

* * * * *